(12) United States Patent  
Gambino et al.

(10) Patent No.: US 9,346,550 B2  
(45) Date of Patent: May 24, 2016

(54) ICE DETECTION AND MITIGATION DEVICE

(71) Applicant: MESOSCRIBE TECHNOLOGIES, INC., Saint James, NY (US)

(72) Inventors: Richard J. Gambino, Port Jefferson, NY (US); Christopher Gouldstone, Cold Spring Harbor, NY (US); Jonathan Gutleber, Northport, NY (US); David Hubble, Costa Mesa, CA (US); Jason Trelewicz, Coram, NY (US)

(73) Assignee: MESOSCRIBE TECHNOLOGIES, INC., St. James, NY (US)

( * ) Notice: Subject to any disclaimer, the term of this patent is extended or adjusted under 35 U.S.C. 154(b) by 26 days.

(21) Appl. No.: 14/098,100

(22) Filed: Dec. 5, 2013

(65) Prior Publication Data

US 2014/0191084 A1     Jul. 10, 2014

Related U.S. Application Data

(60) Provisional application No. 61/733,776, filed on Dec. 5, 2012.

(51) Int. Cl.
*B64D 15/20* (2006.01)
*B64D 15/12* (2006.01)

(52) U.S. Cl.
CPC .............. *B64D 15/12* (2013.01); *B64D 15/20* (2013.01)

(58) Field of Classification Search
CPC ........ B64D 15/12; B64D 15/20; B64D 15/22; B23K 3/353; F26B 3/30; B29C 45/2737; H05B 3/748; H05B 3/742

USPC ....................................................... 244/134 R
See application file for complete search history.

(56) References Cited

U.S. PATENT DOCUMENTS

| 5,896,259 | A  | * | 4/1999  | Farwell et al. .................. 361/78 |
| 6,129,314 | A  | * | 10/2000 | Giamati et al. ............ 244/134 R |
| 6,283,411 | B1 | * | 9/2001  | Giamati et al. ........... 244/134 A |
| 6,753,513 | B2 | * | 6/2004  | Goldberg et al. ............. 219/497 |
| 6,906,537 | B2 | * | 6/2005  | Goldberg et al. ............. 324/721 |
| 7,523,889 | B2 | * | 4/2009  | Bourjac et al. ............. 244/134 D |
| 7,580,777 | B2 | * | 8/2009  | Smith et al. ........................ 701/3 |
| 2003/0210902 | A1 | * | 11/2003 | Giamati .......................... 392/444 |
| 2005/0029236 | A1 | * | 2/2005  | Gambino et al. ........ 219/121.69 |
| 2008/0111028 | A1 | * | 5/2008  | Kumar et al. ............. 244/134 D |
| 2012/0269227 | A1 | * | 10/2012 | Stothers ............................ 374/3 |

FOREIGN PATENT DOCUMENTS

| WO | WO 2004013900 A2 * | 2/2004  |          |
| WO | WO 2004060579 A1 * | 7/2004  | B05D 1/02 |

* cited by examiner

*Primary Examiner* — Brian M O'Hara
*Assistant Examiner* — Assres H Woldemaryam
(74) *Attorney, Agent, or Firm* — F. Chau & Associates, LLC

(57) ABSTRACT

A method for deicing an aerostructure includes driving a sensing current through a heater element coated to an aerostructure, the heater element having a resistance that is temperature dependent. A resistance of the heater element is monitored. It is determined whether there is icing at the heater element using the monitored resistance of the heater element. A melting current is driven through the heater element when it is determined that there is icing at the heater element.

19 Claims, 13 Drawing Sheets

ICE DETECTION AND MITIGATION DEVICE

STATEMENT REGARDING FEDERALLY SPONSORED RESEARCH OR DEVELOPMENT

This invention was made with government support under NASA SBIR Phase I Contract NNX12CD57P awarded by NASA. The government has certain rights in the invention.

CROSS-REFERENCE TO RELATED APPLICATION

The present application is based on provisional application Ser. No. 61/733,776, filed Dec. 5, 2012, the entire contents of which are herein incorporated by reference.

TECHNICAL FIELD

The present disclosure relates to ice detection and, more specifically, to methods and systems for ice detection and mitigation.

DISCUSSION OF THE RELATED ART

Icing is the accumulation of snow, ice, and/or frost on the surface of an aircraft or other vehicle. Icing can interfere with flight or other critical systems and can lead to disaster. Accordingly effective de-icing is critical to safe and efficient air travel.

Various techniques are available for performing de-icing. Known techniques may include physical removal, such as by scraping and pushing, or melting, such as by the application of heat or chemical de-icers.

Electrically heated resistive elements may also be attached to key portions of the aircraft such as the leading edges of wings and tail surfaces, leading edges of propellers and helicopter rotor blades, etc.

Aircrafts may also integrate pumps for applying chemical de-icers to critical surfaces. These integrated de-icing techniques may either be continuously activated under adverse weather conditions, or selectively activated as needed. Selective activation, for activating electrical heaters and/or chemical de-icing pumps may be provided in association with various techniques for ice detection that include one or more sensing elements.

Conventional ice detection methods typically consist of a sensing element that is exposed to the airstream. Ice builds up on this element when it is exposed to icing conditions. In some designs, the ice buildup changes the element's mass, and the mass change causes a shift in vibration frequency, which is measured by the ice detector's electronics. The electronics sends an icing signal when the frequency shift reaches a predetermined threshold. Other ice detection methods include optical transducer probes intrusive to the airstream and hermetically sealed or using un-collimated light to monitor the opacity and optical refractive index of the ice on the probe.

SUMMARY

A method for deicing an aerostructure includes driving a sensing current through a heater element coated to an aerostructure, the heater element having a resistance that is temperature dependent. A resistance of the heater element is monitored. It is determined whether there is icing at the heater element using the monitored resistance of the heater element. A melting current is driven through the heater element when it is determined that there is icing at the heater element.

Determining whether there is icing at the heater element using the monitored resistance at the heater element may include estimating a temperature of the heater element based on the resistance, determining how the estimated temperature of the heater element changes as a result of the sensing current, and determining whether there is icing at the heater element based on the manner in which the estimated temperature changes as a result of the sensing current.

The heater element may be organized as arrays of heater elements on the surface of the aerostructure.

The heater element may be coated to the aerostructure by a direct write method.

The heater element may include one or more materials with positive or negative temperature coefficients of resistance (TCR).

The determining of whether there is icing at the heater element using the monitored resistance at the heater element may include monitoring the resistance of the heater element after a predetermined delay from the driving of the sensing current.

Determining whether there is icing at the heater element using the monitored resistance of the heater element may include utilizing an assumption that an iced heater element takes longer to change resistance upon the driving of the sensing current than a heater element that is free of ice.

The resistance of the heater element may be determined from a voltage of the heater element upon driving the sensing current.

The Amperage of the sensing current may be substantially less than the Amperage of the melting current.

The sensing current may be driven for a shorter duty cycle than the melting current.

One or more additional sensors may be used to estimate the temperature of the heating element.

The heater element may be a first heater element and the one or more additional sensors may be part of a second heater element in communication with the first heater element or a control circuit thereof.

The heater element may include a metallic material.

The heater element may have a resistance approximately equal to a resistance of NiCr.

The heater element may include a plurality of parallel lines with a fixed line length, width and spacing.

Determining whether there is icing at the heater element using the monitored resistance of the heater element may include analyzing a determined rate of change for the resistance of the heater element after the driving of the sensing current.

Analyzing the determined rate of change for the resistance of the heater element may include comparing the determined rate of change to a predetermined threshold. The rate of change for the resistance of the heater element may be determined by tracking the monitored resistance of the heater element over time and calculating an instantaneous rate of change thereof at a predetermined time. The instantaneous rate of change of the monitored temperature may be calculated after a predetermined time delay from the start of the driving of the sensing current. The instantaneous rate of change of the monitored resistance may be averaged over a predetermined time frame.

Determining whether there is icing at the heater element by analyzing the determined rate of change may include taking into account a present air speed.

A method for deicing an aerostructure includes monitoring a temperature at a heater element coated to an aerostructure using a temperature monitoring device coated to the aerostructure and in close proximity to the heater element. It is determined whether there is icing at the heater element using the monitored temperature at the heater element. A melting current is driven through the heater element when it is determined that there is icing at the heater element.

The temperature may be monitored by measuring a resistance of the heater element and calculating a temperature from the measured resistance.

The heater element may include a single heater module that is coated to the aerostructure as part of an array of said heater modules.

The array of heater elements may be connected to each other by copper traces.

A system for de-icing an aerostructure includes a sensing-current driving device for driving a sensing current through a heater element coated to an aerostructure, the heater element having a resistance that is temperature dependent. A monitoring device for monitoring a resistance of the heater element is provided. A processing unit for determining whether there is icing at the heater element using the monitored resistance of the heater element is provided. A melting-current driving device for driving a melting current through the heater element when it is determined that there is icing at the heater element is provided.

A system for detecting ice on a surface of an aerostructure includes a sensing-current driving device for driving a sensing current through a coil element coated to an aerostructure, the coil element having a resistance that is temperature dependent. A monitoring device monitors a resistance of the coil element. A processing unit determines whether there is icing at the coil element using the monitored resistance of the coil element.

A self de-icing aerostructure includes an aerostructure component and one or more self-regulating de-icing arrays coated to the aerostructure component. Each of the one or more self-regulating de-icing arrays includes a plurality of miniature heater elements having a resistivity that is temperature dependent.

A method for detecting ice on a surface of an aerostructure includes driving a sensing current through a heater element coated to an aerostructure, the heater element having a resistance that is temperature dependent. A resistance of the heater element is monitored. It is determined whether there is icing at the heater element using the monitored resistance of the heater element.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Figure 1:
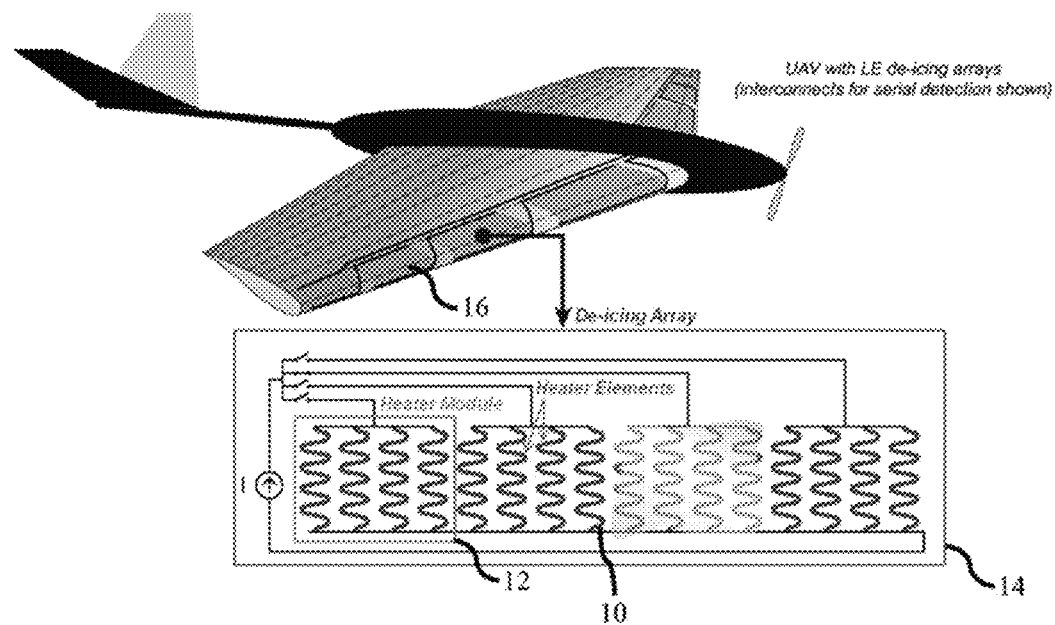
FIG. 1 is a conceptual illustration of an exemplary embodiment of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention provide various systems and methods for detecting ice formation on surfaces of aircraft and other sensitive equipment. These systems and methods may include integrated heating elements for performing de-icing upon ice detection or the systems and methods may be used independently for ice detection.

Exemplary embodiments of the present invention may incorporate self-regulating de-icing arrays into aerodynamic structures, which may detect and remove ice buildups. These arrays may also be self-sensing and may monitor the health and condition of the aerostructure that they are applied to. As used herein, an aerostructure may include any aircraft, spacecraft or a unit, component, or section thereof. The arrays may be sprayed onto the desired aerostructure components with Direct Write or other coating processes with or without masking. FIG. 1 is a conceptual illustration of an exemplary embodiment of the present invention. This exemplary approach includes miniature heater elements 10 that are combined in parallel to form active heater modules 12, and further bridged into arrays 14 to comprise a unified de-icing system. While the de-icing function of the system may be enabled by the resistive heater materials, the ice detection function arises from selecting a material with a resistivity that is also inherently dependent upon temperature. For example, materials with positive or negative temperature coefficients of resistance (TCR) may be used to detect ice. Areas that contain ice buildups may be actively cooled by the ice buildups as a result of the higher effective heat capacity of the ice, whereas un-iced regions will heat up in response to short duration current pulses. This difference may manifest as a change in the module voltage for ice-containing areas (e.g., magnitude and sign a function of the chosen material), thus representing the detection component of the system. Power may then be supplied to the modules covered with ice to locally heat the surface, in turn melting the interface and removing the accreted ice. In this way an active de-icing component may be realized.

Additional sensors may be separate from or included as part of the aforementioned array and further information regarding status of the craft may therefore be provided. These sensors may include thermocouples, RTDs, strain sensors and/or heat flux sensors.

Accordingly, the self-regulating ice detection and de-icing system illustrated in FIG. 1 may employ temperature sensitive resistance heater elements 10 combined into heater modules 12, and subsequently patterned into arrays 14 on aerodynamic composite surfaces, such as leading edges 16.

Exemplary embodiments of the present invention may be integrated into the structure of the aircraft or other sensitive equipment. In this way, the de-icing arrays may be non-intrusive to the airstream and may not adversely affect aerodynamics. In addition the detector modules may be placed in strategic locations on the vehicle for ice accretion monitoring rather than a single probe location. The detection modules may also be used for de-icing themselves or be interconnected in a network to de-icing modules to provide a smart de-icing solution which can conserve vehicle power.

Exemplary embodiments of the present invention may employ detection strategies alone, or combined ice detection and de-icing/anti-icing capability. In addition, de-icing and/or anti-icing functions may be employed without the detection component.

The heating element material used may be metallic. For example, metallic heating element materials may be used having a resistivity that is on the order of standard heater materials (e.g. NiCr). Accordingly, the geometry may take the form of an array of parallel lines of appropriate length (L) and width (W) to satisfy the power requirements given by $V^2 \cdot R$, where $R = nR_{sh}$ (n is the number of squares in the meandering pattern given by L/W). Furthermore, the spacing between, and total number of heater elements may be determined to avoided cold spots so that effective de-icing may be achieved.

A heater module in accordance with exemplary embodiments of the present invention may include a plurality of parallel lines formed of a metallic conductor with a fixed line length, width and spacing. For example, there may be approximately 250 lines that are spaced approximately 1 mm apart and each may have a length of approximately 500 mm. The resistance of the parallel array may be adjusted by varying the line width, space width and line thickness to get the appropriate resistance for a power density of 2 kw/m$^2$ assuming a 24 volt aircraft power supply. For example, an appropriate line width of Ni80Cr20 alloy may be 400 µm ($4 \times 10^{-4}$ m) when the conductor thickness is 50 µm. For a lower resistivity metal like Ni a line width of about 200 µm may provide the desired resistance. Lines in this dimensional range may readily be deposited using known deposition techniques such as Direct-Write Therman Spray (DWTS) provided by MESOSCRIBE TECHNOLOGIES, INC. Examples deposition techniques may be found in U.S. Pat. No. 6,576,861; U.S. Pat. No. 7,208,193; and U.S. Pat. No. 7,709,766, each of which is incorporated herein by reference.

The heater modules may be connected to a multiplexing switching system for ice detection. Based on a conceptual design of 250 lines of 500 mm length, each module may require 250 W for a power density of 2000 W/m$^2$ so a current of 10.4 Amps (250 W/24V) may be achieved. The switching system may be capable of switching currents of this magnitude. The current may also be measured as a function of time for ice detection. In an ice detection mode, the module may be powered up for approximately 3 seconds and during that time the heater temperature may increase at a rate of about 5° C./sec with a power density of 2000 W/m$^2$. The current may decrease as a result of an increase in resistivity of the alloy. The TCR of NiCr is about 400 ppm/C and that of Ni is about 8000 ppm/C so Ni may be used as a more sensitive ice detector.

If ice is present the heating rate may be much slower because of the extremely large effective heat capacity of the ice. If ice is detected, the module may be left on for a longer time until the heater module temperature begins to increase at closer to the adiabatic rate of about 5° C./sec.

The duty cycle may be about 10% for ice detection, about 3 seconds on per module for 10 modules every 300 seconds. For ice minimization, 100% duty cycle may be required on any given module.

Copper conductor lines may be used for power and control. These lines may also be deposited by DWTS. According to MIL-W-5088, the maximum current carrying capacity of a 16 AWG wire is 22 amperes. The diameter of a 16 AWG wire is 1.291 mm (cross-sectional area 1.309 mm2) so it can be replaced by a DWTS copper line of comparable cross section.

For an unmanned aerial vehicle (UAV) with a wing span of about 3 meters, each wing may be equipped with 6 modules, for example, on the leading edge and extending aft. De-icing modules may also be provided on other air foil surfaces. All of the modules on one wing may be connected to a common power bus line between sets of modules. The common bus and the control lines may lead back to the fuselage for power, switching and interrogation electronics.

Figure 2:
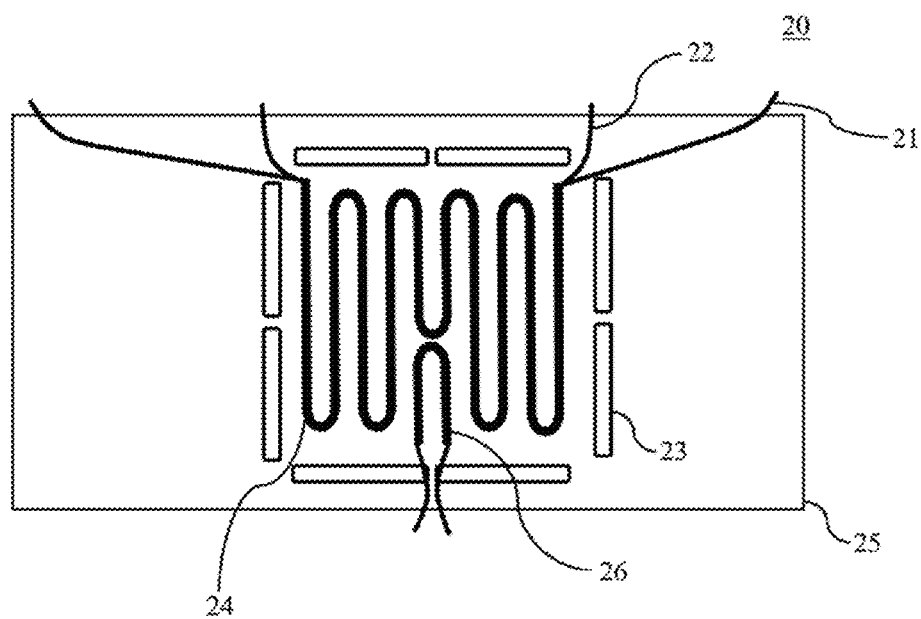
FIG. 2 is a schematic diagram illustrating an example of a stainless steal (SS) heater having completed wiring connections in accordance with exemplary embodiments of the present invention.

FIG. 2 illustrates an example of a stainless steal (SS) heater having completed wiring connections in accordance with exemplary embodiments of the present invention. Power may be supplied to the heater 20 through the power lines 21. The heater 20 may include heater traces 24 that may coil across the surface of the heater 20. The heating traces 24 may be disposed on a stainless steel substrate 25. The actual voltage across the heater 20 may be measured using two sense lines 22. The heated area including the heater traces 24 may be thermally isolated from the rest of the sample by machining isolation slots 23 around its perimeter. These slots 23 may be filled with a low conductivity clear epoxy to prevent water from filling them during ice formation. Thermal isolation of the heater traces 24 may force heat through the ice instead of allowing transverse conduction of the heat within the substrate. This may simplify the analysis required to sense icing using the system.

The detector heater may be tested to determine thermoelectric properties as well as to determine ice removal capabilities. These characteristics may be used in interpreting icing sensor data. In monitoring the temperature of the sample during testing, thermocouples 26 may be installed on the device. For example, a Direct Write thermocouple may be included on the heater surface to measure the heater temperature while a second wire thermocouple may be welded to the back side of the heater to monitor the temperature drop across the heater substrate. The power line leads 21 may be copper wires soldered to the Direct Write copper power traces. The Direct Write copper power traces may overlap the end terminals of the heater element pattern traces 24. For implementation in an aircraft, the power distribution traces may be made significantly longer and integrated into the wing structure.

Figure 3:
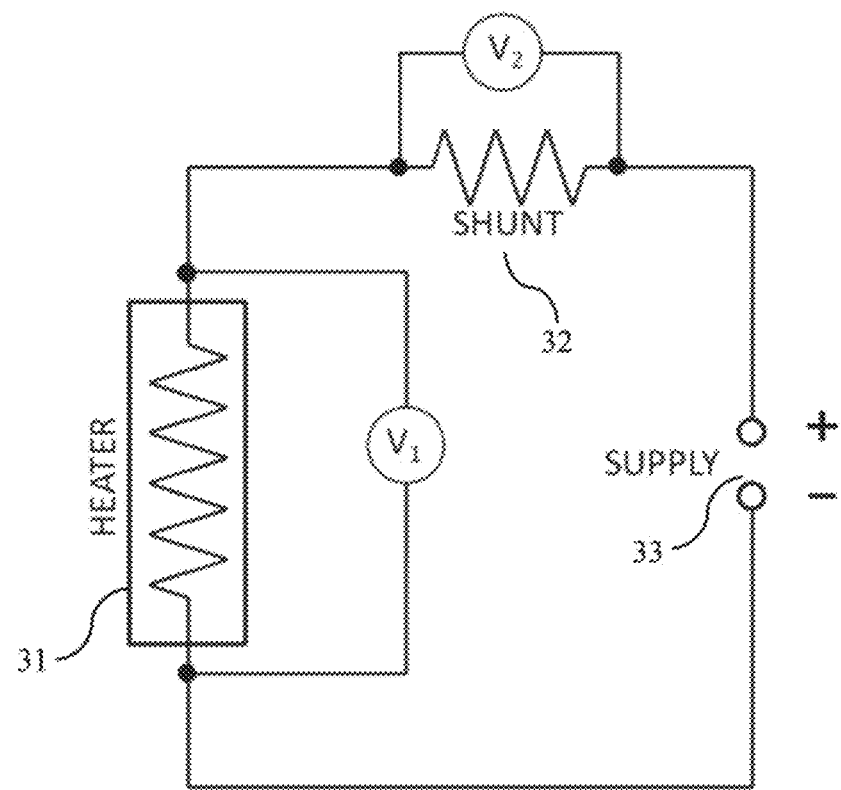
FIG. 3 is a schematic diagram illustrating exemplary circuitry for testing electrical measurements in accordance with exemplary embodiments of the present invention.

FIG. 3 is a schematic diagram illustrating exemplary circuitry for testing electrical measurements in accordance with exemplary embodiments of the present invention. Electrical measurements may be made using a Keithley model 2701 data acquisition system using a 7700 20 channel scan card sampling at 1 Hz. Power may be supplied by a power supply 33 such as an Extech 0-30VDC programmable power supply. By measuring the voltage drop across the heater 31 ($V_1$) and by using a shunt 32 to determine the current through the heater 31 ($I=V_2/R_{shunt}$), the heater 31 resistance may be determined during testing ($R_{heater}=V_1/I$).

Four ice detection methods in accordance with exemplary embodiments of the present invention are described in detail below.

Method 1: Temperature Rise after Time Delay

Figure 4:
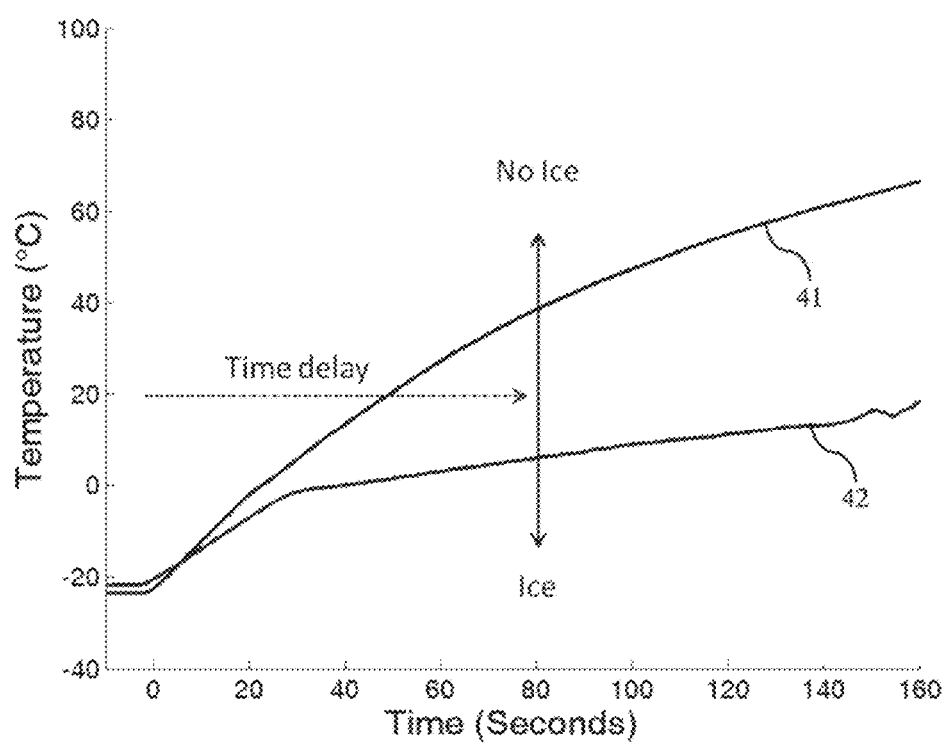
FIG. 4 is a graph demonstrating how the temperature rise threshold may be applied in accordance with exemplary embodiments of the present invention.

In this method, the heater may be activated causing its temperature to increase. If there is ice on the surface, the heater's temperature may increase much more slowly than if there is no ice on the surface. This phenomenon may be amplified once melting commences, as the melting of the ice absorbs heat. Therefore, for a given heat flux level, a time delay is chosen which is sufficiently long such that no matter the flight conditions, if ice is present then melting will occur. FIG. 4 is a graph demonstrating how the temperature rise threshold may be applied in accordance with exemplary embodiments of the present invention. Here the top line 41 represents exemplary data that may be observed in the presence of ice while the bottom line 42 represents exemplary data that may be observed in the absence of ice. For this example the time delay may be 80 seconds and the temperature threshold may be 20° C. Accordingly, after a time delay of 80 seconds, if the heater temperature is below 20° C. then ice is determined to be present and if the temperature is greater than 20° C. then it is determined that there is no ice.

Note that these levels are provided as examples and a higher heat flux would reduce the time delay to a more reasonable level.

This method may be relatively simple and easy to implement. No complicated calculations may be needed. Calculation may be limited to a temperature comparison after a time delay. In this approach, the final temperature for both the ice and no ice cases may be dependent on the airspeed. As the airspeed increases, the temperature rise decreases. Therefore, a low speed iced case might have the same temperature rise as a high speed no ice case at the same air temperature. Accordingly, calibration may be performed based on airspeed which may be inputted into the detection scheme. Additionally, the initial melting of the ice/wing interfaces may cause the ice to be removed sooner than expected by the slip stream. In such a case, the heater may then resume heating at its initial rate and could indicate a false negative.

Method 2: Temperature Derivative Threshold during Ice Melting

Figure 5:
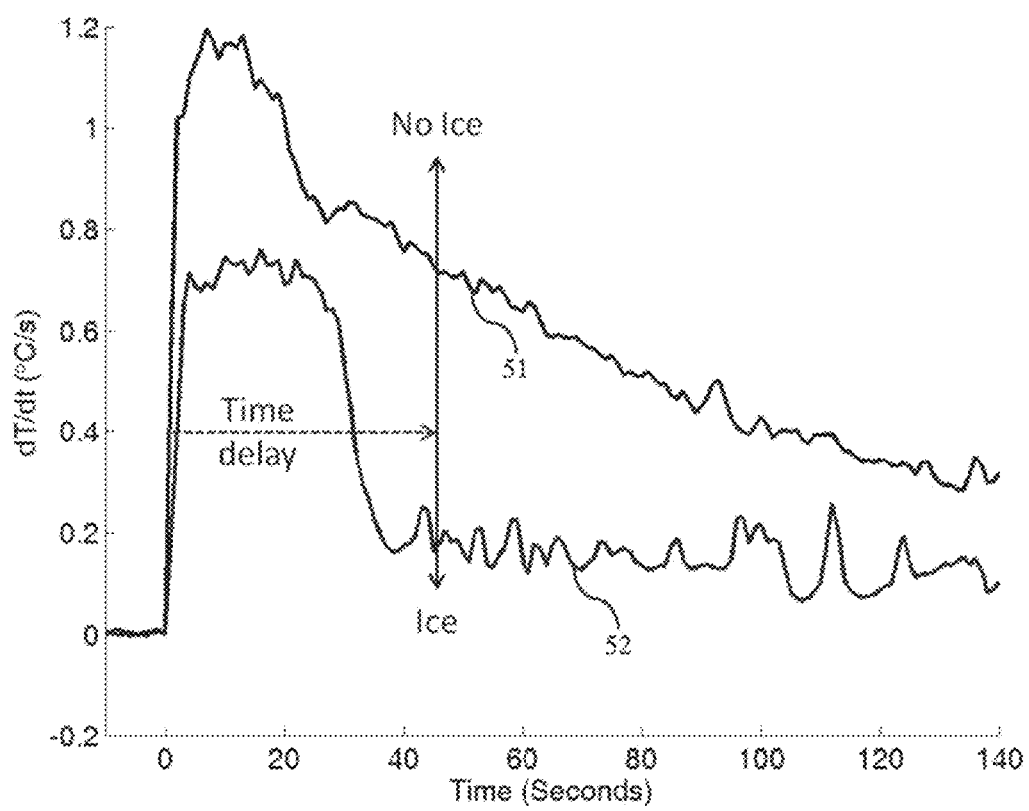
FIG. 5 is a graph demonstrating how the temporal derivative (dT/dt) of the two curves shown in FIG. 4 may be used to detect ice in accordance with exemplary embodiments of the present invention.

Method 2 examines the rate of temperature change. Specifically, this method looks for the small slope that coincides with the phase change of the ice. FIG. 5 is a graph demonstrating how the temporal derivative (dT/dt) of the two curves 41 and 42 shown in FIG. 4 may be used to detect ice. Here, the top curve 51 represents exemplary data that might be obtained in the absence of ice while the bottom curve 52 represents exemplary data that might be obtained in the presence of ice. For the no ice case, the slope spikes and then gradually decreases as a growing percentage of the heat input is lost to convection instead of increasing the sample temperature. For the iced case, the derivative is high initially, though not as high as the no ice case for the reason previously stated. Then, when melting begins to occur, the slope drops to a much lower value.

Method 2 detects ice by looking for this small slope that accompanies ice melt. A time delay is selected that is long enough where melting will have initiated. If the derivative is larger than some threshold (0.4° C./s for this example) then no ice may be determined to be present. If it is lower, then ice may be determined to present.

In accordance with this approach, since the curves change much more abruptly when the ice begins to melt, the time delay can be made shorter. This may provide for a more rapid measurement and the ice is less likely to be blown off yielding a false negative. Second, a shorter test time may allow for less time between sequential measurements resulting in a faster overall detection of icing conditions. Also, the margin of error between a positive and negative reading may be larger, further reducing the risk of a false negative.

As in Method 1, here airspeed still plays a role. As the airspeed increases, the no ice case line will be driven down, reducing the margin of error between the two curves. In addition, anytime a derivative is calculated there is the potential for noise amplification. Care may be taken to ensure the cleanest possible signals are acquired. However, modern current and voltage measurement devices may have a sufficiently large signal to noise ratio to prevent airspeed from posing a problem.

Method 3: Initial Temperature Derivative

Figure 6:
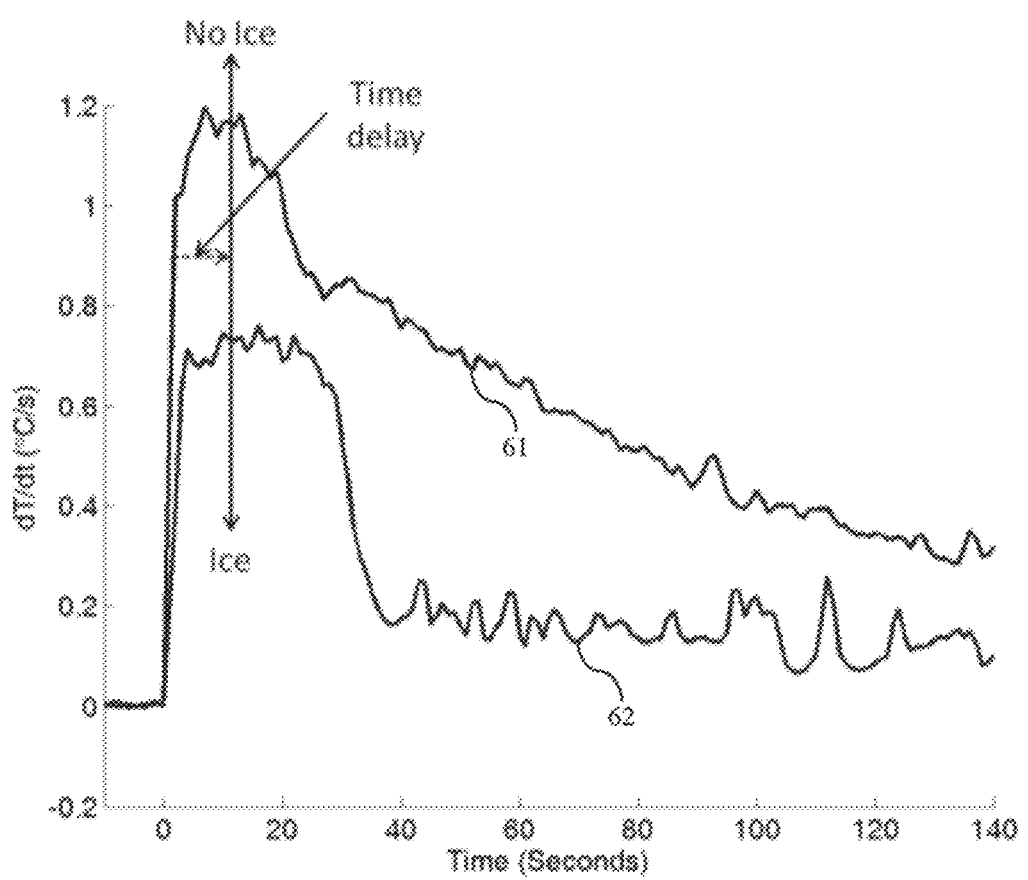
FIG. 6 is a graph illustrating an approach for detecting ice based on initial temperature derivative in accordance with exemplary embodiments of the present invention.

Exemplary embodiments of the present invention may look at the temperature derivative of the increase in thermal mass of the ice, rather than the ice melting, as in Method 2, to detect the ice. Here, the temperature slope immediately after the heater is activated is examined. In this context, "immediately" may mean up to several seconds, for example, one to ten seconds depending on the heater's location relative to the surface and the number and type of layers used in the final construction. The initial heating rate of the structure is reduced if ice is present because the ice increases the total thermal mass of the system. This effect may be used to detect the ice. FIG. 6 is a graph illustrating an approach for detecting ice based on initial temperature derivative in accordance with exemplary embodiments of the present invention. Here the top curve 61 represents data that may be observed in the absence of ice while the bottom curve 62 represents data that may be observed in the presence of ice. Here, the temperature slope immediately after heater activation is considered.

This method of detection overcomes several limitations of the two aforementioned methods. First, since the detection is made prior to ice melting, the risk of a false negative due to the ice having been blown off is much reduced. Second, the initial slope is unaffected by airspeed because in the temporal derivative of the heat transfer equation the convective heat transfer coefficient drops out.

$$\frac{dT}{dt_{t=0}} = \frac{q''}{\rho \delta C}$$

where q" is the heat flux and the denominator is the average thermal mass per unit area.

That is, the initial time rate of change of temperature depends only on the heat flux divided by the average thermal mass per unit area.

Accordingly, this method may be easier to implement as optimization is not required to function at different airspeeds.

The lack of airspeed dependence should also increase the overall reliability of the method. Since this method also relies on a derivative, it has the same noise amplification concerns that Method 2 had. This could be a particular problem if a noise spike happens to occur at the value chosen for the time delay. Another concern with this method is that it requires the ice layer to significantly increase the thermal mass of the test region. Depending on the total thickness of the test region, it is possible that this method would not be as sensitive to very thin ice layers.

Therefore, to ensure adequate sensitivity, the thermal mass of the test region should be as small as possible so that even a thin ice layer significantly increases the overall thermal mass. Also, the heater should be positioned as close to the wing surface as possible so that the time delay can be made as small as possible.

Method 3 may be independent of airspeed and may have a relatively low chance for false negative. This method may be applied to multiple pairs of tests at multiple different heat flux levels. For example, the temporal derivatives for 12 tests may be normalized by the applied heat flux from each test. The normalization collapses the data into an iced region and a no ice region. Method 3 may separate the two regions for all 12 cases. If the time delay were set at, for example, 5 seconds, a normalized slope greater than 1.5 ° C.·cm²/J may indicate no ice and a value less than 1.5 C·cm²/J may indicate ice was present. Accordingly, a fast, accurate measurement may be obtained in all 12 cases.

Method 4: Average Initial Temperature Derivative

In method 4, method 3 is modified. Here, it is the average derivatives from the time that the heater is activated at t=0 until the time delay from method 3 (t=τ) that is analyzed. The average temperature slope may determine a metric for detection. Mathematically this metric may be found by calculating the average of the derivative function by integrating it and then dividing by the integration duration, for example, in accordance with the following formula:

$$\text{Metric} = \frac{1}{\tau}\int_0^\tau \frac{dT}{dt} dt = \frac{1}{\tau}(T(\tau) - T(0))$$

Note that the integration cancels the differentiation and that the metric used in Method 4 is the temperature rise divided by the time delay, τ. All that is required is the temperature when the heater is first activated and the temperature after the heater has been on for t=τ. This method is similar in principle to Method 1 discussed previously. However, in Method 1 it was the melting of the ice that was used to differentiate between the two cases. Here, the time delay is short and the ice hasn't yet begun to melt. A concern with Method 1 is that the ice would be removed by the slip stream prematurely as a result of the melting interface. Since τ is kept short in Method 4, this is no longer a concern. Keeping τ short also minimizes the airspeed influence since not enough time is allowed for the surface to heat and begin convecting energy away from the surface.

Figure 7:
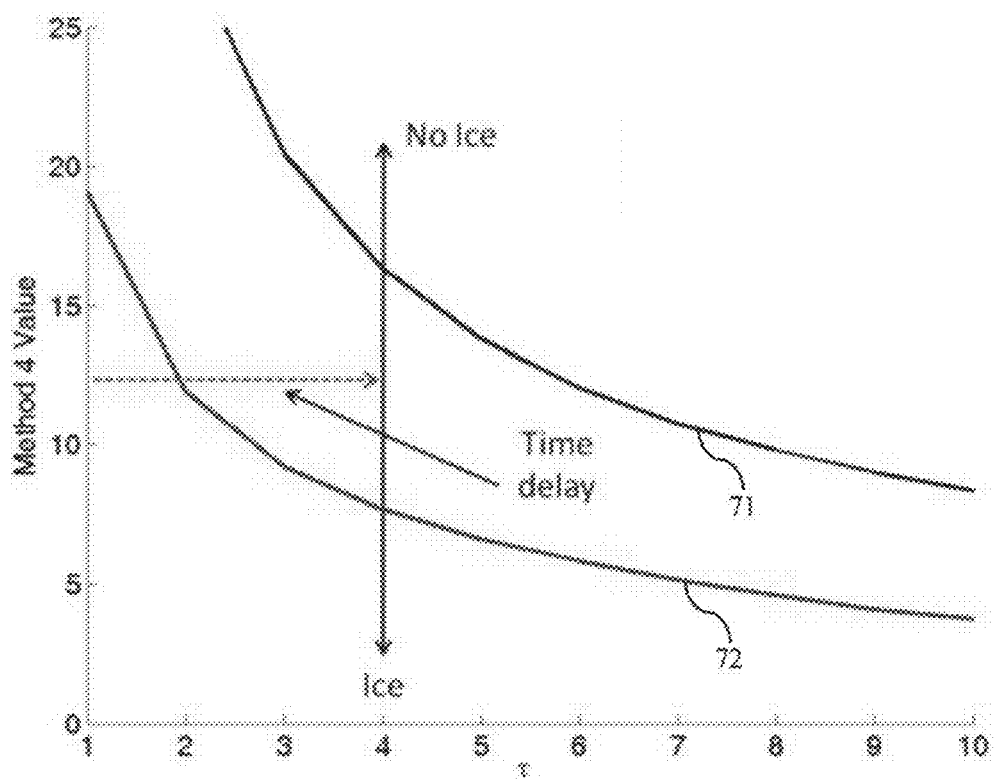
FIG. 7 is a graph illustrating an approach for differentiating between the iced and no ice cases in accordance with exemplary embodiments of the present invention.

FIG. 7 is a graph illustrating how Method 4 may be able to differentiate between the iced and no ice cases. The data shown in this figure may be obtained from 2 tests of fiberglass-backed detectors. The smoothing of the integration process may be seen. For the data shown, a time delay of 4 seconds and a threshold of 12 would give an accurate detection with a relatively large margin of error. Here, the top curve 71 represents the no ice case while the bottom curve 72 represents the ice case. Ice detection according to method 4 may look at the average temperature slope from t to τ.

The four test methods described above may be examined with regard to their benefits and limitations discussed above and summarized in Table 1. With the aforementioned analysis in mind, Method 4 may be chosen as a compromise of reliability, accuracy, and simplicity.

Methods 1 and 2 may require the ice to melt before any detection took place. The possibility of the ice being removed prematurely and causing a false negative detection to occur may not be acceptable. The smoothing and averaging effects of Method 4 compared to Method 3 may make Method 4 a good choice since there isn't the chance for a single differential noise spike at t=τ to compromise the measurement. Instead, the entire temperature rise during heating is examined leading to a much cleaner signal compared to the temperature derivative. Additionally, Method 4 may be computationally simple since it does not require the derivative to be calculated.

Method 4 may be applied to any number of individual tests, and may be performed on two different fiberglass-backed detectors (bare and mil-spec epoxy) over the range of icing conditions, airspeeds, and air temperatures. A value for τ may be chosen which is considered a good compromise between margin of error and speed of measurement. In general, it may be desirable for τ to be as small as possible since this reduces both the airspeed influence and the time required to obtain a measurement. The only requirement is that τ be large enough that the thermal energy has had time to diffuse through the material to the surface. Therefore, the optimal value of τ may be dependent on the total thermal mass of the detector structure and may need to be determined once a final design is determined. For the fiberglass-back detectors, τ=4 s may be determined to be optimal and the separation that occurs when τ=4 s may be used in Method 4. Detectors on both bare fiberglass and mil-spec coated fiberglass may be shown to perform substantially identically.

For reference, the mean value for the iced and no iced cases as well as 3 standard deviations from the mean (shown as dotted lines) are also shown. A threshold value between these two dotted lines would work well as a detection criterion. For example, a value of 12 would be a good choice for the data presented. Therefore, any test whose metric value falls below 12 may indicate that ice is present and any value greater than 12 may indicate that no ice is present.

Three detection methods may be examined with regard to their benefits and limitations discussed above and summarized in Table 1.

TABLE 1

Comparison of detection methods

| METHOD | PRO | CON |
|---|---|---|
| 1. Temperature rise after predetermined time | Simplest to implement | Airspeed influence False negative if ice falls off before $t_{test}$ |
| 2. dT/dt after melting begins | Large margin of error between positive and negative | Requires derivative calculation (noise magnification) Airspeed influence False negative if ice falls off before $t_{test}$ |
| 3. dT/dt immediately after heating begins | Fast measurement Small airspeed influence False negative unlikely | Requires derivative calculation (noise magnification) Smaller margin of error between positive and negative |

TABLE 1-continued

Comparison of detection methods

| METHOD | PRO | CON |
|---|---|---|
| 4. Average initial dT/dt | Fast measurement False negative unlikely | Possible dependence on total thickness of structure/layup Less margin of error between ice and no ice cases |

The metric numbers for each test may be easily calculated from the heater resistance value which itself is determined from the values of voltage and current supplied to the heater. The following formula may be used to calculate the values shown:

$$\text{Metric} = \frac{R(\tau) - R(0)}{R(0) \cdot TCR \cdot \tau}$$

Method 4 may be applied to the data acquired on the metal substrate samples. The method may be able to separate between the iced and no ice cases, although the margin of error is slightly smaller compared to the tests performed on fiberglass substrates. This is because the thermal mass of the metal substrates is higher and, when ice is added, the percentage increase in thermal mass is less. This is also why the metric values are significantly smaller and the required time delay is larger in the metal substrate tests.

Method 4 may be applied to test data taken on the heaters deposited onto liquid crystal polymer (LCP) which may then be adhered to a fiberglass substrate. These heaters may be fundamentally different than the other fiberglass heaters because the heater trace is embedded within the structure instead of being on the actual surface. Since the heater trace itself is not in direct contact with the ice, the sensitivity is somewhat lower than the other fiberglass tests as shown by the smaller difference between the ice and no ice metric values. Still, there is no overlap in the metric values and a threshold could be chosen which would separate the two cases, albeit with a smaller margin of error.

The ice detection method outlined above may work by detecting the heat sink effect of the ice. Therefore, anything that effectively removes heat from the surface could also be registered as surface ice by the detector. A potential challenge occurs when a continuous supply of small water droplets, mist or fog, is blown across the surface. This could occur during light drizzle or simply flying through a cloud. The high specific heat of the liquid water provides for very effective heat removal when the heater is activated and its rate of temperature increase remains low, potentially even lower than the iced case. For example, in performing a test, mist may be sprayed into the airstream that impacted the surface. These mist tests may be performed at temperatures just above freezing without formation of ice during the test.

Figure 8:
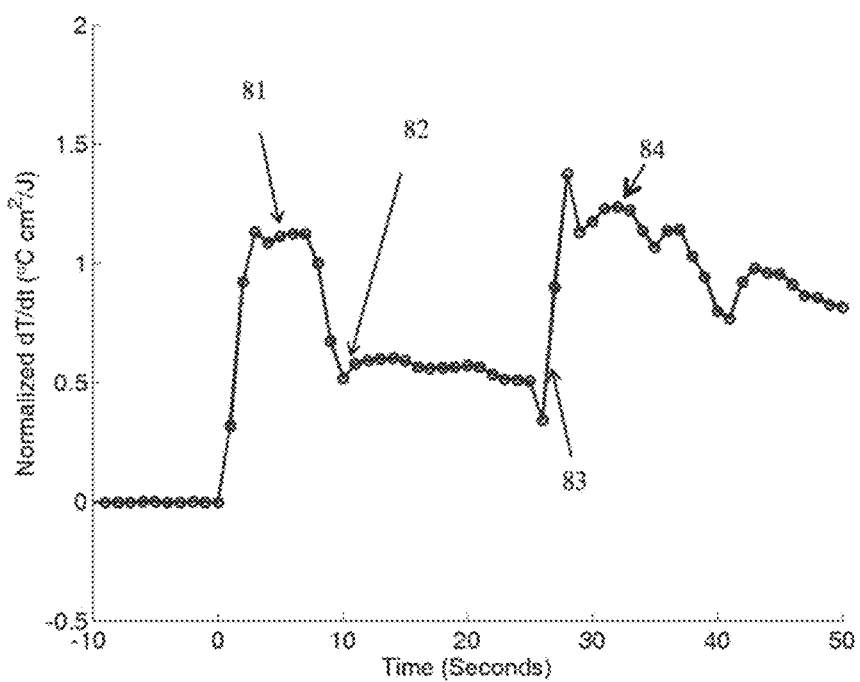
FIG. 8 is a graph illustrating an approach for ice detection, ice removal, and the verification of the removal in accordance with exemplary embodiments of the present invention.

Regardless of the method used to detect ice, once ice has been detected it may be removed, for example, by initiating de-icing. The same heater used to detect the ice may also be used to remove the detected ice by either completely melting it, or by melting enough of the ice/wing interface such that the slipstream can remove it fully. Additionally, the system may use distinct detection modules and de-icing modules. The presence of ice may be monitored during the removal process. FIG. 8 is a graph illustrating an approach for ice detection, ice removal, and the verification of the removal in accordance with exemplary embodiments of the present invention. Here, the slope of the normalized dT/dt may be observed to show a rapid increase followed by a first plateau 81 indicative of ice detection. A rapid fall followed by a second plateau 82 may be indicative of the beginning of melting. The end of melting may be demonstrated by a sharp rise 83. Completion of removal may be demonstrated by a gradual decline 84 thereafter.

As described above, the ice detection arrays may be sprayed onto the desired aerostructure components with Direct Write or other coating processes with or without masking. Direct Write may be used to fabricate heater modules. The total heater length may be approximately 56 cm, the trace thickness may be approximately 0.05 mm (0.002") and the width may be approximately 1 mm for the Alloy 42 FeNi, and 0.5 mm for the higher conductivity Alumel. A heater pattern resistance of approximately 20 ohms may accordingly be provided for both element materials. Heater modules may be fabricated onto both stainless steel (SS) and aluminum (Al) substrates, as shown in FIG. 7. The coupons may be 80 mm×120 mm. Thickness may be 1.57 mm (0.062") for SS and 1.27 mm (0.050") for Al. Copper conductors may be deposited on each heater to transition the power leads to the Fe- or Ni-based heating element pattern. A ceramic insulating coating may be applied by Direct Write to prevent the heater element from short circuiting to the metallic substrates.

Figure 9:
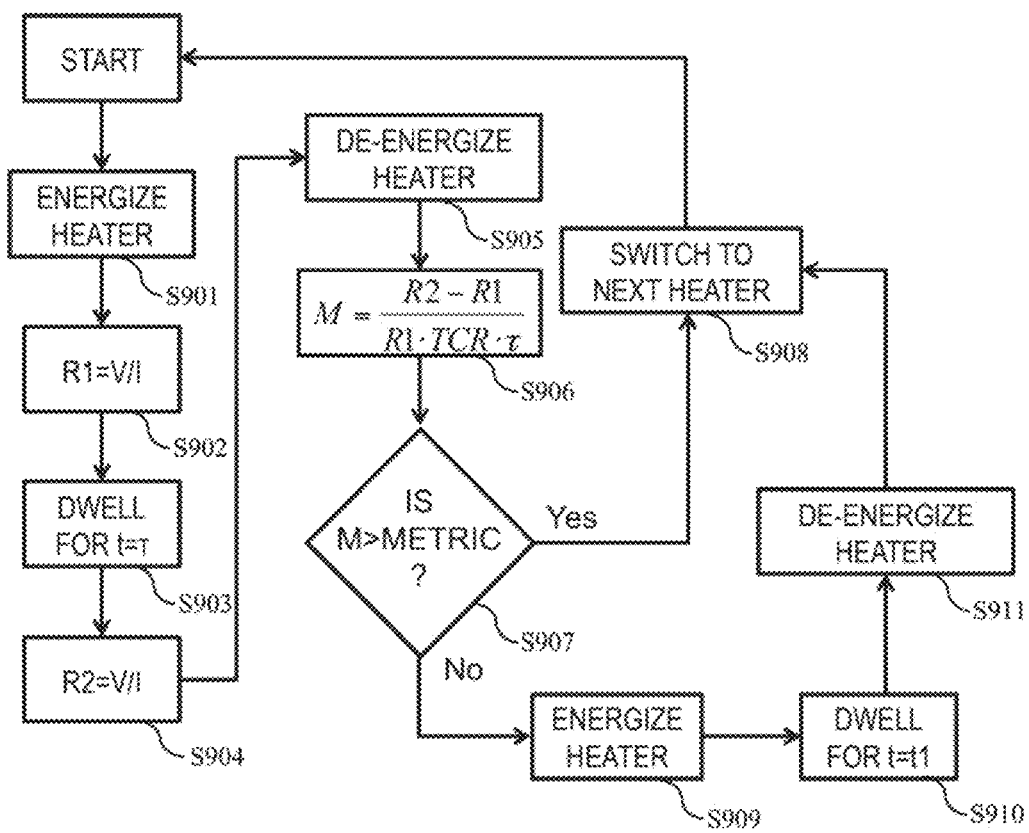
FIG. 9 is a flow chart illustrating an approach for performing ice detection and melting in accordance with exemplary embodiments of the present invention.

FIG. 9 is a flow chart illustrating an approach for performing ice detection and melting in accordance with exemplary embodiments of the present invention. The device is first energized by sending a current, I, through the heater trace (Step S901). Immediately after energizing, the initial resistance [R(0)] of the heater trace is measured as the applied voltage divided by the supplied current (Step S902). The device then remains energized for a predetermined period of time τ (Step S903). This dwell time may be dependent on design factors and must be determined for each different embodiment of the invention through ice tunnel testing. At the end of the dwell period, the final heater resistance [R(τ)] is measured (Step S904) and the device is deactivated by switching the current off (Step S905). At this point, the average heating rate (M) of the device is calculated from the two measured resistances, the temperature coefficient of resistivity of the heater trace material, and the activation dwell time τ (Step S906).

The presence of ice may then be determined by comparing the average heating rate value measured to a metric value which is determined through ice tunnel testing (Step S907). If the heating rate is high (Yes, S907), no ice is present and the device switches to the next heater along the surface of interest (Step S908). An M value smaller than the predetermined metric value (No, S907) indicates that ice is present on the surface. When ice is detected the heater is re-energized (Step S909) in order to melt the ice-wing interface and remove the ice from the surface. To ensure that the ice is removed, the heater remains energized for a time period of t1 which has been determined, with an appropriate factor of safety, through ice tunnel testing (Step S910). After removal, the heater is de-energized (Step S911) and the device switches to the next heater along the surface of interest (Step S908) and the process is repeated.

Heaters may be fabricated directly onto fiberglass composites, composites with mil-spec epoxy coatings and onto flexible films. Accordingly, the de-icer device may be structurally integrated into a composite structural part of the aircraft. Laminate sheets manufactured from fiberglass pre-preg may be procured for deposition. The heater module pattern may be deposited onto laminate panels as-received as well as coated with a mil-spec epoxy coating. A Direct Write heater module may also be deposited onto liquid crystal polymer (LCP) films and laid up with fiberglass laminate using a vacuum bag technique. The film may be positioned face down on the laminate to embed the heater in the laminated structure. The terminal pads for the Direct Write TC and power traces may be exposed through local removal of the LCP film for lead wire attachment by soldering.

A stainless steel heater, after wiring connections have been completed, may be produced by the use of a stainless steel substrate. Alternatively, the substrate may include fiberglass, aluminum or another suitable material. Power may be supplied to the heater via the power lines while the actual voltage across the heater may be measured using the two sense lines. Isolation slots may be machined around the perimeter of the heater pattern on the metal substrates to provide thermal isolation of the heated area. These slots may be filled with a low conductivity clear epoxy to prevent water from filling them during ice formation. Thermal isolation of the heater may simplify the analysis as it forces the heat through the ice instead of allowing transverse conduction within the substrate. Isolation slots may not be required for the fiberglass due to its lower thermal conductivity.

A Direct Write thermocouple may be included on the heater surface to measure the heater temperature while a second wire thermocouple may be attached to the back side of the heater to monitor the temperature drop across the heater substrate. Copper wire power leads may be soldered to the Direct Write copper power traces. The copper power traces may overlap the end terminals of the heater element pattern. For implementation in an aircraft, the power distribution traces may be made significantly longer and may be integrated into the wing structure. The samples may be tested for functionality by ice tunnel testing.

Figure 10:
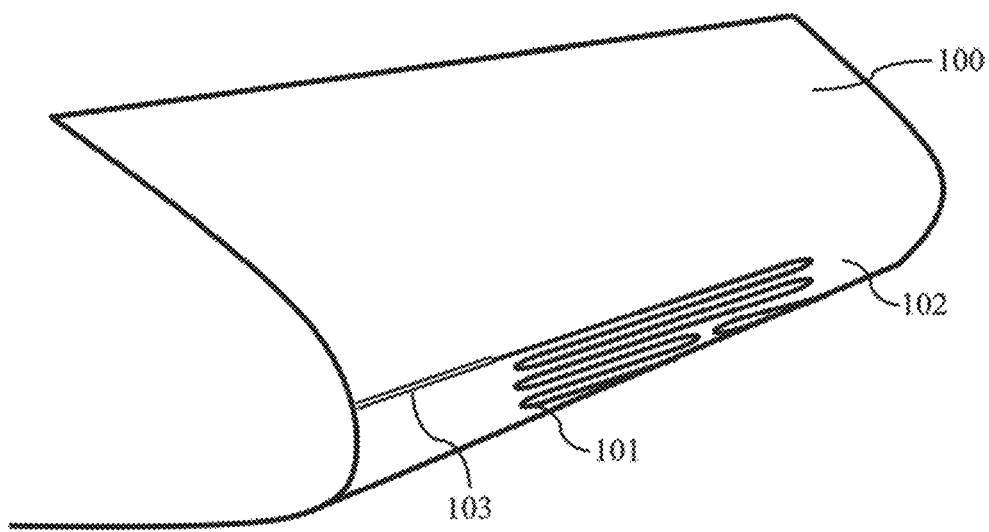
FIG. 10 is a diagram illustrating an example of how the ice detecting and melting apparatus may be integrated into an airplane wing in accordance with exemplary embodiments of the present invention.

FIG. 10 is a diagram illustrating an example of how the ice detecting and melting apparatus may be integrated into an airplane wing in accordance with exemplary embodiments of the present invention. FIG. 10 shows a plane wing section 100. The wing section may be coated with mil-spec epoxy over the existing paint layer. A heater pattern 101 representative of a parting strip may be deposited on the leading edge 102 of the plane wing section 100. Copper power traces 103 may be extended from the heater terminal ends to the edge of the airfoil. The parting strip geometry may be used on some craft for leading edge anti-icing.

As described above, heater fabrication and trials may be used to provide important information for calibrating the system so that accurate ice detection may be provided. Heater fabrication trials may utilize coupons of 304 SS (0.062") and 6061 Al (0.050") to simulate erosion caps. A ceramic insulator may be applied prior to heater deposition. Fabrication may be performed directly onto a fiberglass composite structure. Deposition may be performed onto a flexible LCP film. Demonstration of film integration into composite may be performed by curing a composite lay up in a vacuum bag.

Exemplary embodiments of the present invention may be applied to conceptual aircraft level integration, for example, a UAV may be considered with wing span of about 15 m each wing. Such an aircraft may be equipped with approximately 25 modules configured around the leading edge, as illustrated in FIG. 10. Ice detection and minimization arrays may be integrated on other critical surfaces, particularly targeting areas where icing is a known problem such as, cowlings, antennas and propellers. All modules on a given area may be connected to a common power bus between sets of modules to minimize the density of conductors and corresponding weight impact. The common bus and control lines may be routed to a single, convenient location using Direct Write for connection to the interrogation and switching electronics.

Figure 11:
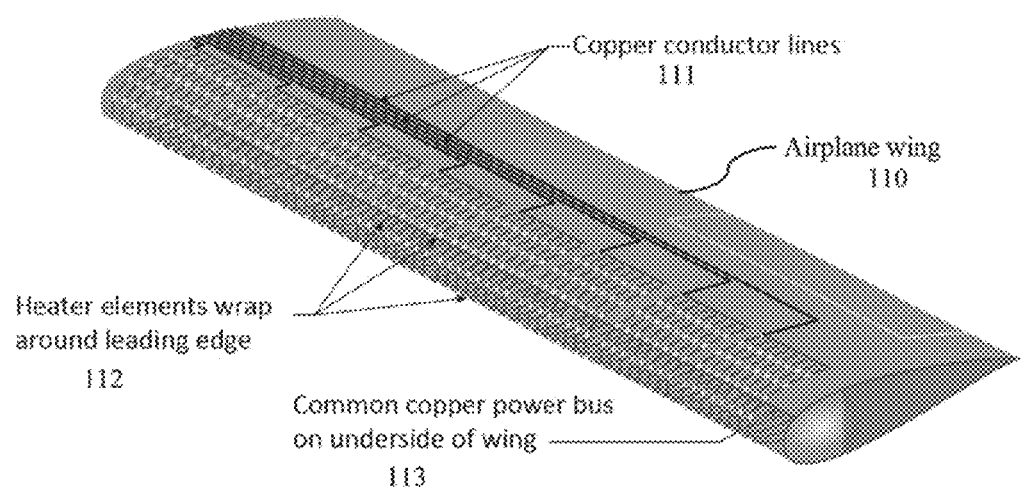
FIG. 11 is a schematic view of a Direct Write ice detection and minimization system around the leading edge of a UAV airfoil in accordance with exemplary embodiments of the present invention.

FIG. 11 is a schematic view of a Direct Write ice detection and minimization system around the leading edge of a UAV airfoil in accordance with exemplary embodiments of the present invention. While elements are depicted on the surface for clarity, in application the system may be implemented on the underside of a surfacing film for composite wings or components. Here, an airplane wing 110 is illustrated. On the surface of the wing 110, are copper conductive lines and heater elements 112 wrapped around the leading edge of the wing 110. A common copper power bus 113 is disposed on an underside of the wing 110.

Figure 12:
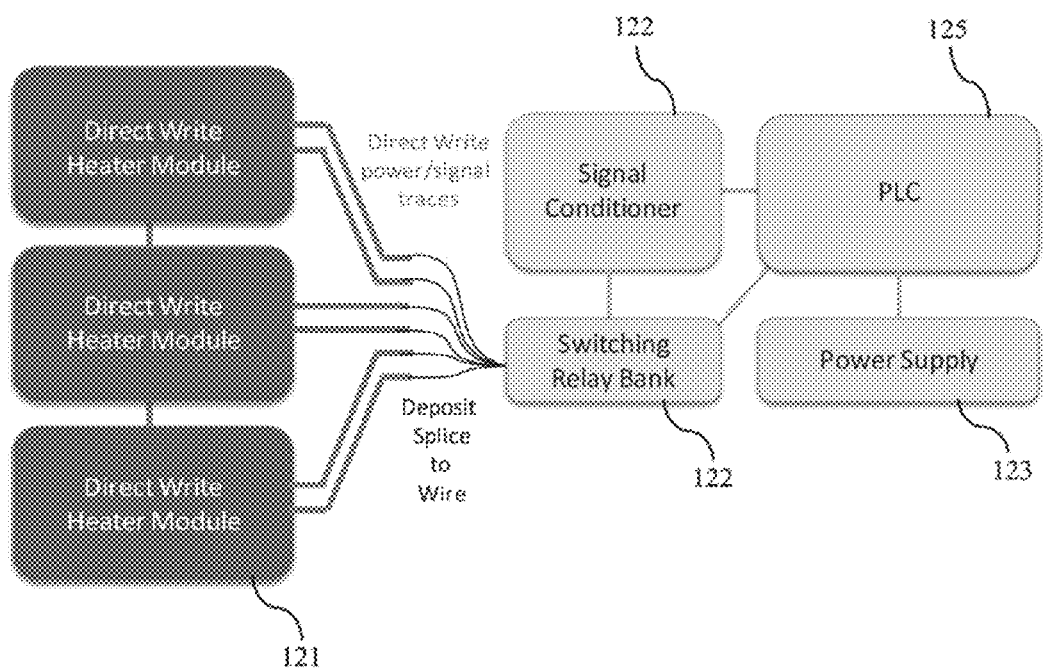
FIG. 12 is a schematic diagram of system components for an ice detection/melting device in accordance with exemplary embodiments of the present invention.

FIG. 12 is a schematic diagram of system components for an ice detection/melting device in accordance with exemplary embodiments of the present invention. The system may include a heater module array 121, a switching relay bank 122, power supply 123, signal conditioner 124, and a controller 125. Power traces may be spliced to conventional wires at a location convenient to do so on the structure, e.g., at the base of the wing. Wire traces may be used to trace connections using both parallel gap resistance and laser micro-welding.

Direct Write process may be used to develop a durable, low-profile, system for both ice detection and minimization (de-icing or anti-icing). Modules may be deposited on films for incorporation onto or within composite components.

Figure 13:
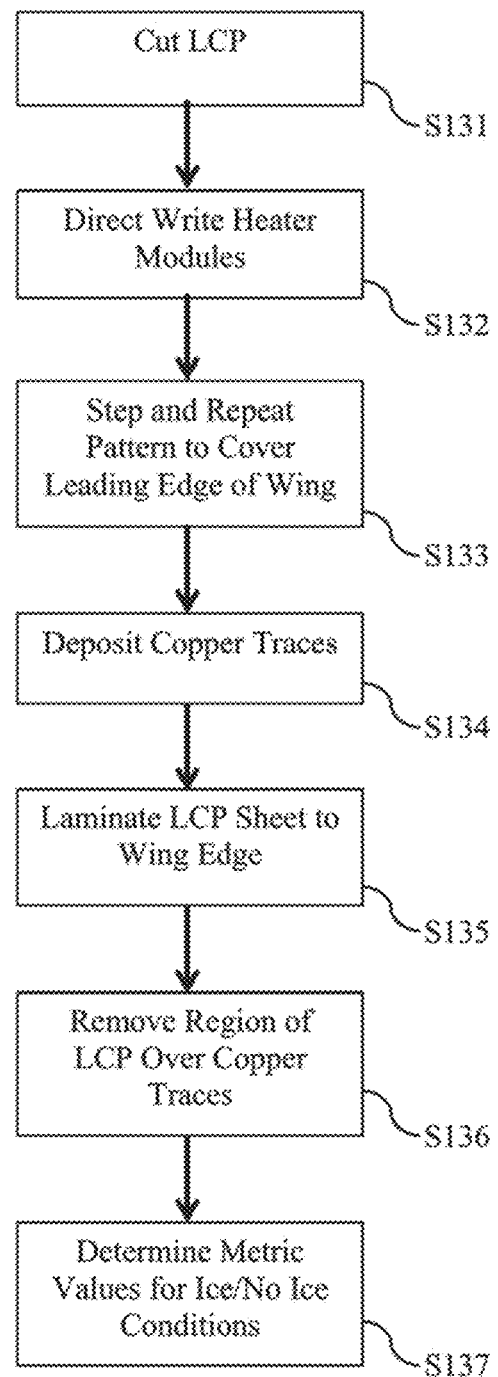
FIG. 13 is a flow chart illustrating steps for fabricating a Direct Write ice detection and minimization system according to exemplary embodiments of the present invention.

FIG. 13 is a flow chart illustrating steps for fabricating a Direct Write ice detection and minimization system according to exemplary embodiments of the present invention. First, a sheet of liquid crystal polymer (LCP) may be cut into a rectangle with length equal to the length of the wing section and sufficient width to cover the leading edge of the wing section (Step S131).

Next, Direct Write heater modules may be disposed onto the LCP by direct write thermal spray of stainless steel using robotic control of the writing head to follow a tool path designed to produce the meander line heater pattern (Step S132).

Then, the header pattern deposition may be stepped and repeated so that a series of heater modules cover an area equal to the area of the leading edge of the wing section (Step S133).

Copper power traces may be deposited to connect to and over-lap the end of each of the stainless steel heating elements using direct write thermal spray and an appropriate tool path of the conductor lines (Step S134). The conductor lines may lead to the inboard end of the wing section for connection to the power supply, switching electronics and data acquisition system is located. The cross-sectional area of the copper conductor may be about 1.3 mm$^2$ so that it can carry a current of 10 amperes without over heating.

The LCP sheet may then be laminated to the leading edge of the wing section with the heater lines and conductor traces facing the surface of the wing (Step S135). A room temperature setting epoxy resin may be used to bond the LCP to the wing section. A vacuum bag may be used to press the LCP sheet into intimate contact with the surface of the wing.

Small regions of the LCP over the copper traces near inboard end of the wing section may be removed so that a wire can be attached to the end of each copper conductor (Step S136). The wires may be connected to the switching box as shown, for example, in FIG. 11.

One of the devices may be tested in an ice tunnel to determine the metric value for ice and no-ice conditions at three different values of air speed (Step S137). The metric values so determined may be used to set up the Programmable Logic Controller (PLC) so that ice may be accurately detected for the particular heating units so constructed.

Additional steps may be performed if the aircraft skin is metallic or if a different method of deposition of the metal lines is used.

What is claimed is:

1. A method for deicing an aerostructure, comprising:
driving a sensing current through a heater element coated to an aerostructure, the heater element having a resistance that is temperature dependent;
monitoring a resistance of the heater element;
determining whether there is icing at the heater element using the monitored resistance of the heater element; and
driving a melting current through the heater element when it is determined that there is icing at the heater element,
wherein determining whether there is icing at the heater element comprises determining the resistance of the heater element at a first time based on the monitored resistance of the heater element, determining the resistance of the heater element at one or more second times based on the monitored resistance of the heater element, calculating an instantaneous rate of change of the resistance of the heater element based on the determined resistance at the first time and one or more second times, and determining that there is icing on the heater element when the calculated instantaneous rate of change of the resistance of the heater is within a predetermined threshold.

2. The method of claim 1, wherein the heater element is organized as arrays of heater elements on the surface of the aerostructure.

3. The method of claim 1, wherein the heater element is coated to the aerostructure by a direct write method.

4. The method of claim 1, wherein the heater element includes one or more materials with positive or negative temperature coefficients of resistance (TCR).

5. The method of claim 1, wherein the resistance of the heater element is determined from a voltage of the heater element upon driving the sensing current.

6. The method of claim 1, wherein an Amperage of the sensing current is substantially less than an Amperage of the melting current.

7. The method of claim 1, wherein the sensing current is driven for a shorter duty cycle than the melting current.

8. The method of claim 1, wherein one or more additional sensors are additionally used to estimate a temperature of the heating element.

9. The method of claim 8, wherein the heater element is a first heater element and the one or more additional sensors are part of a second heater element in communication with the first heater element or a control circuit thereof.

10. The method of claim 1, wherein the heater element comprises a metallic material.

11. The method of claim 1, wherein the heater element has a resistance approximately equal to a resistance of nickel-chromium (NiCr).

12. The method of claim 1, wherein the heater element comprises a plurality of parallel lines with a fixed line length, width and spacing.

13. The method of claim 1, wherein determining whether there is icing at the heater element includes taking into account a present air speed.

14. A method for deicing an aerostructure, comprising:
monitoring a temperature at a heater element coated to an aerostructure using a temperature monitoring device coated to the aerostructure and in close proximity to the heater element;
determining whether there is icing at the heater element using the monitored temperature at the heater element; and
driving a melting current through the heater element when it is determined that there is icing at the heater element,
wherein determining whether there is icing at the heater element comprises determining the temperature of the heater element at a first time based on the monitored temperature of the heater element, determining the temperature of the heater element at one or more second times based on the monitored temperature of the heater element, calculating an instantaneous rate of change of the temperature of the heater element based on the determined temperature at the first time and one or more second times, and determining that there is icing on the heater element when the calculated instantaneous rate of change of the temperature of the heater is within a predetermined threshold.

15. The method of claim 14, wherein the temperature is monitored by measuring a resistance of the heater element and calculating a temperature from the measured resistance.

16. The method of claim 14, wherein the heater element comprises a single heater module that is coated to the aerostructure as part of an array of said heater modules.

17. The method of claim 16, wherein the array of heater elements are connected to each other by copper traces.

18. A system for de-icing an aerostructure, comprising:
a sensing-current driving device for driving a sensing current through a heater element coated to an aerostructure, the heater element having a resistance that is temperature dependent;
a monitoring device for monitoring a resistance of the heater element;
a processing unit for determining whether there is icing at the heater element using the monitored resistance of the heater element; and
a melting-current driving device for driving a melting current through the heater element when it is determined that there is icing at the heater element,
wherein determining whether there is icing at the heater element comprises determining the resistance of the heater element at a first time based on the monitored resistance of the heater element, determining the resistance of the heater element at one or more second times based on the monitored resistance of the heater element, calculating an instantaneous rate of change of the resistance of the heater element based on the determined resistance at the first time and one or more second times, and determining that there is icing on the heater element when the calculated instantaneous rate of change of the resistance of the heater is within a predetermined threshold.

19. A system for detecting ice on a surface of an aerostructure, comprising:
a sensing-current driving device for driving a sensing current through a coil element coated to an aerostructure, the coil element having a resistance that is temperature dependent;
a monitoring device for monitoring a resistance of the coil element; and
a processing unit for determining whether there is icing at the coil element using the monitored resistance of the coil element,
wherein determining whether there is icing at the coil element comprises determining the resistance of the coil element at a first time based on the monitored resistance of the coil element, determining the resistance of the coil element at one or more second times based on the monitored resistance of the coil element, calculating an instantaneous rate of change of the resistance of the coil element based on the determined resistance at the first time and one or more second times, and determining that there is icing on the coil element when the calculated instantaneous rate of change of the resistance of the coil is within a predetermined threshold.

* * * * *